(No Model.)
J. DAY.
TETHER.
No. 601,952. Patented Apr. 5, 1898.
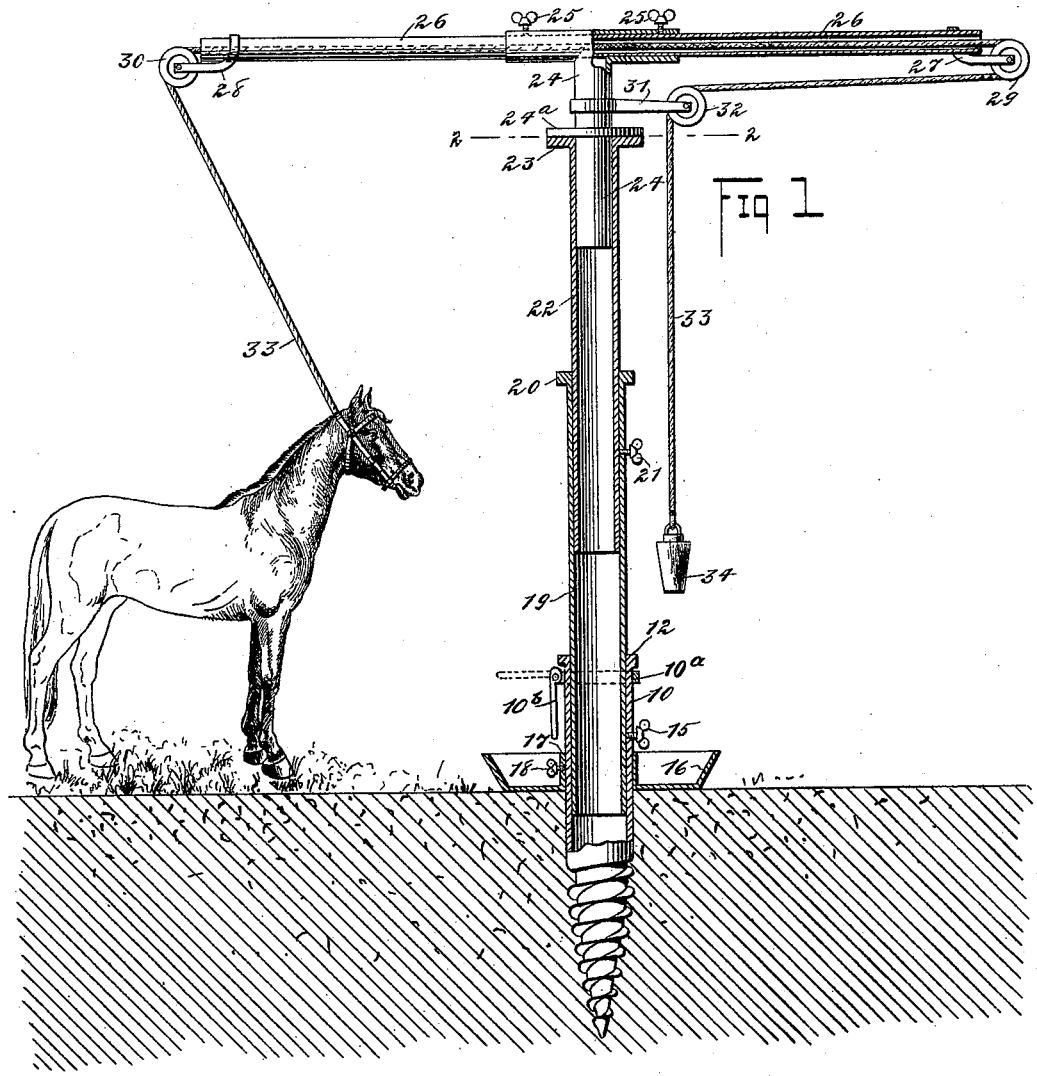
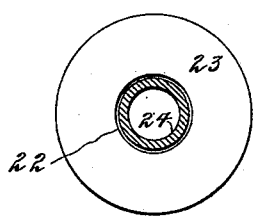
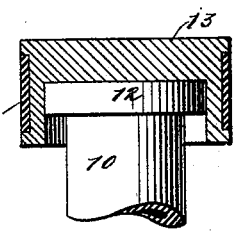
WITNESSES
INVENTOR
J. Day.
BY
ATTORNEYS.

UNITED STATES PATENT OFFICE.

JOHN DAY, OF LOGANSPORT, INDIANA.

TETHER.

SPECIFICATION forming part of Letters Patent No. 601,952, dated April 5, 1898.

Application filed September 3, 1897. Serial No. 650,456. (No model.)

*To all whom it may concern:*

Be it known that I, JOHN DAY, of Logansport, in the county of Cass and State of Indiana, have invented a new and Improved Tether, of which the following is a full, clear, and exact description.

The object of the invention is to provide a tether which is made in adjustable sections, the sections being so arranged that they may be easily assembled to form a standard and a cross-bar connected with the standard, the cross-bar serving to guide the tether-rope and to protect the major portion of the same.

A further object of the invention is to construct the device in a simple, durable, and economic manner, and so that an animal will be comfortable when attached thereto and will have freedom of movement within predetermined bounds, and whereby the movement of the animal in any direction will not tend in the slightest degree to entangle the tether-rope.

Another object of the invention is to provide a means whereby a water or a feed trough may be attached to and adjusted upon the standard of the device.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a partial vertical section and partial side elevation of the improved tether. Fig. 2 is a horizontal section on the line 2 2 of Fig. 1; and Fig. 3 is a vertical section through a driving-cap, showing its application to the lowermost member of the standard of the tether or the member that is to be driven into the ground.

The device in its entirety consists of a standard, a cross-arm revolubly carried by the standard, and a weighted tether-rope which in the main is guided by the cross-arm. The standard is made in adjustable sections, metal tubing being preferably employed in its construction. The standard consists of a base-section 10, the lower end 11 whereof is pointed and formed with a spiral thread or flange, and the upper end of the base-section is provided with a rib 12. In order that this section may be driven readily into the ground without injury to the section, I provide a driving-cap 13, (shown in Fig. 3,) which is usually made of wood, having a recess in its under face to receive the upper end of the said base-section, the wood being prevented from spreading by a metal band 14.

Before the base-section 10 is driven into the ground the said section is passed through a flanged opening 17, made in the central portion of a pan 16, which may be used as a trough for water or a trough for feed. This pan is adjustable on the base-section of the standard and is held in place by a set-screw 18 or a like device. The base-section is provided with one or more set-screws 15, extending into its interior, and the base-section is adapted to receive a second section 19, which at its upper end is also provided ordinarily with a rib 20. The section 19 is also provided with one or more set-screws 21. The second section 19 receives the lower end of a third section 22, the third section being held in adjusted position in the two sections of the standard by a set-screw 21. The third section 22 of the standard is provided at its upper end with a table or flange 23.

A T-head 24, also tubular, is introduced into the upper section 22 of the standard and is held to turn therein, the said T-head being provided upon its vertical member with a flange or a table 24ª, adapted to turn upon the flange or table 23 of the standard, and, if desired, friction-rollers or their equivalents may intervene these two flanges or tables to facilitate an easy movement of the head on the standard. A tubular cross-arm 26 is passed through the upper or horizontal member of the T-head 24, extending beyond both ends of said member about an equal distance, and the cross-arm is securely held in the head by set-screws 25 or like devices, as shown in Fig. 1.

At one end of the cross-arm a bracket 27 is projected downward and outward therefrom, while a similar bracket 28 is located at the upper end of the cross-arm, the bracket 27 carrying a pulley 29 and the bracket 28 a pulley 30, the upper peripheral portions of the pulleys being in horizontal alinement with the interior of the cross-arm. A horizontal hanger or a bracket 31 is secured to the vertical member of the head 24, but extends outward therefrom in direction of the pulley 29, the hanger 31 being provided with a pulley 32. A tether-rope, or a chain 33 is passed over the pulley 32, around the pulley 29, through the cross-arm 26, over the pulley 30, and the end of the tether rope or chain passed over the pulley 30 is fitted for engagement with the halter of a horse or a stall that may be placed upon the animal's head, while at the opposite end of the tether-rope, at the other side of the standard, a weight 34 is secured.

A ring $10^a$ loosely encircles the base-section 10 below the rib 12, and to said ring is pivoted a lever $10^b$, having a cam-head, which when the lever is carried up to the position shown in dotted lines in Fig. 1 will bind the ring upon the section 10. By means of said lever the base-section may be turned into or out of the ground, and after release of said lever the latter will fall to the position shown in full lines in Fig. 1.

When the tubular arm 26 is moved to the right, the radius of the circle in which the animal tethered may have movement is shortened, and when said tubular arm is carried to the left the radius of the circle in which the animal may have movement is lengthened.

In operation it will be observed that the animal is free to move within certain limits around the standard of the tether and that at no time will the tether-rope become entangled. Again, the tether-rope is subjected to the least possible amount of friction and is protected from the weather for the greater portion of its length by the cross-arm through which it passes. By carrying the tether through the cross-arm the said arm will revolve much more freely and respond quicker to the action of the animal than if the tether-rope were placed outside of the arm, and the rope is not so liable to decay. It is also obvious that the feed or water trough may be so placed on the standard as to be readily accessible to the animal, thus supplying a want long needed in devices of this description.

It is evident from the construction above set forth that the weight 34 need not be heavy, and consequently the animal will not be inconvenienced to any great extent in feeding. The weight 34 is intended only to take up the slack of the tether-rope and to prevent the end of the rope to which it is attached from being withdrawn from the guide-pulley 32, thereby limiting the range of grazing.

Having thus fully described my invention, I claim as new and desire to secure by Letters Patent—

1. A tether consisting of a tubular standard constructed in adjustable sections, means for securing the sections together, a tubular T-head mounted to turn on the upper section of the standard, a tubular cross-bar extending through the upper or horizontal member of the T-head and projecting at both ends thereof, the said cross-bar being adjustable in the said member of the T-head, guides at the ends of the cross-bar, a tether-rope passing over the said guides and through the said tubular cross-bar, and means for turning said standard for the purpose set forth.

2. In a tether, the combination with a standard constructed in adjustable sections, and locking devices for the sections, the uppermost section of the standard being provided with a flange or table, of a T-shaped tubular head held to turn in the upper section of the standard, the head being provided with a flange or table adapted to turn upon the corresponding part of the standard, a tubular cross-bar secured in the horizontal portion of the T-head, fastening devices for the said cross-bar, guides located at the ends of the cross-bar, a guide carried by the said T-head, and a tether-rope weighted at one of its ends, passed over the said guides and through the said tubular cross-bar, for the purpose set forth.

3. In a tether, the combination, with a standard constructed of tubular telescopic sections, the various sections being provided with fastening devices, of a T-head provided with a horizontal member and fastening devices at said member, a tubular cross-bar secured in the horizontal member of the head, extending beyond both ends thereof, guides located at the ends of the tubular bar and upon the T-head, and a rope weighted at one end, passed over the said guides and through the said cross-bar, whereby the end of the rope adapted for attachment to the animal will be at the side of the standard opposite that at which the weight is located, and whereby the rope will have little frictional contact and the major portion of the rope will be protected, for the purpose specified.

4. In a tether, the combination, with a standard constructed in tubular telescopic sections, sundry of the sections being provided with fastening devices, the upper section being provided with a horizontal flange or table, and a trough carried by the standard, and adjustable thereon, of a T-head having a tubular vertical section, the said T-head being arranged to turn in the upper portion of the standard and provided upon its vertical member with a horizontal flange or table adapted to engage with a corresponding flange or table on the standard, a tubular cross-arm secured in the vertical member of the said head, extending beyond both ends of the said member, fastening devices for the said arm, pulleys secured to the cross-arm, one at each end, and a third pulley secured upon the T-head, and a tether rope or chain provided with a weight at one end, the rope or chain being carried from the weight over the pulley on the T-head, over one of the pulleys on the cross-arm, through the cross-arm and over the opposing pulley on said arm, as specified.

5. A tether consisting of a standard, a tubular cross-bar adjustably held in a support mounted to turn at the upper end of said standard, the said cross-bar extending beyond both ends of said support, a guide-pulley supported at each end of the said tubular cross-bar, the upper peripheral portion of each pulley being in horizontal alinement with the interior of the cross-bar, the support for said cross-bar being also provided with a guide-pulley, and a weighted tether rope or chain passing through the said tubular cross-bar and over the said guide-pulleys, substantially as set forth.

6. A tether, comprising a standard carrying a trough and provided with means for turning the said standard into and out of the ground, a tubular cross-bar held in a support mounted to turn at the upper end of the standard, brackets located at the ends of the cross-bar, the said brackets each carrying a guide-pulley having its upper peripheral portion in horizontal alinement with the interior of the cross-bar, the support for said cross-bar being also provided with a guide-pulley, and a weighted tether rope or chain passing through the said tubular cross-bar and over the said guide-pulleys, substantially as described.

7. In a tether, the combination with a standard made in sections and a tether rope or chain carried by the standard, the base-section of said standard being pointed at its lower end and provided with a spiral thread or flange, and having a rib at its upper end, of a ring loosely encircling the base-section below the rib, and a lever pivoted to the ring and having a cam-head adapted when the lever is carried to the horizontal position to bind the ring upon the section, whereby the base-section may be turned into or out of the ground by means of said lever, as and for the purpose set forth.

JOHN DAY.

Witnesses:
   DELBERT P. FLYNN,
   ROBERT KRENGBERGER.